Patented June 25, 1940

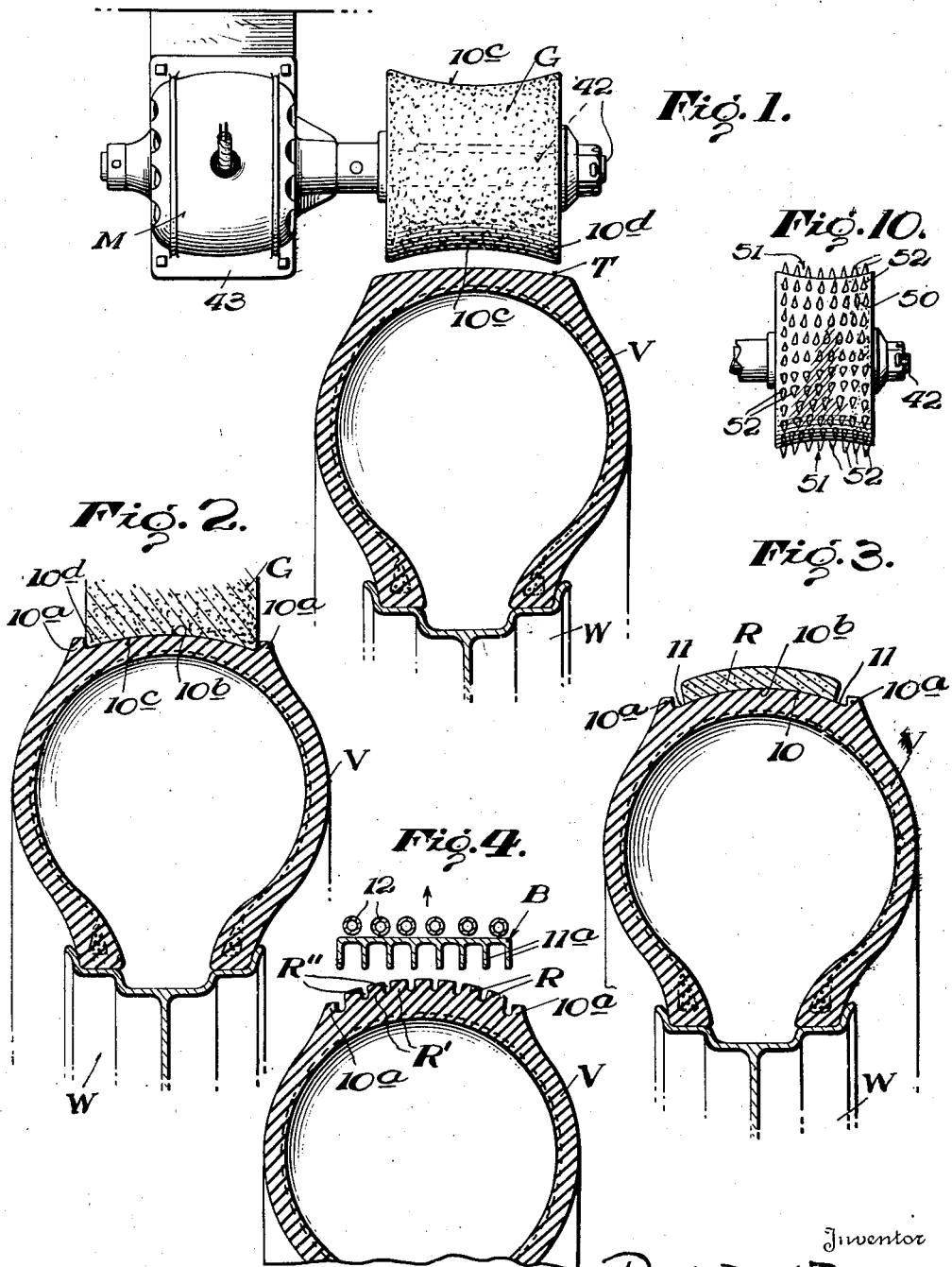

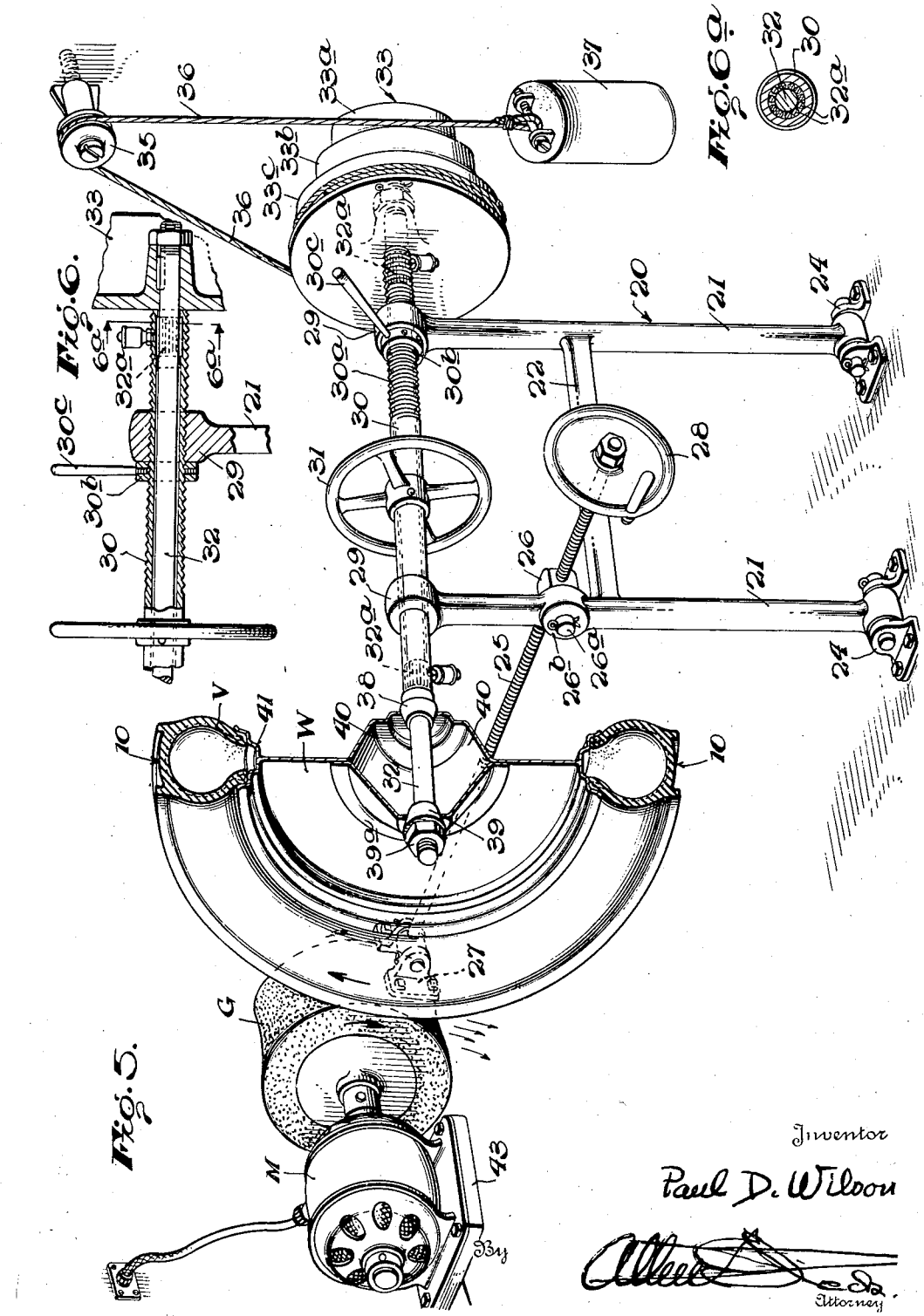

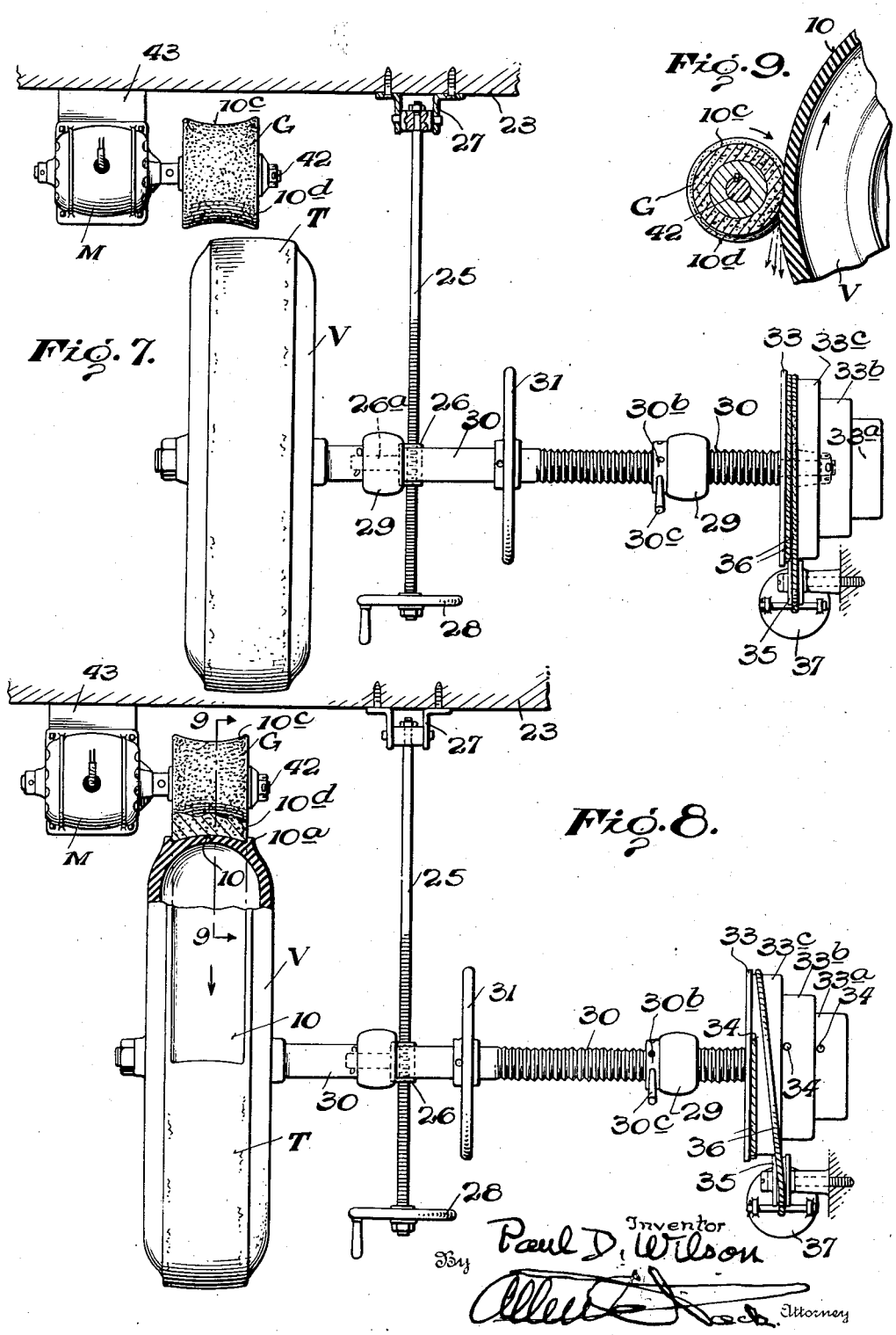

2,205,939

UNITED STATES PATENT OFFICE 2,205,939

APPARATUS FOR RETREADING VEHICLE TIRES

Paul D. Wilson, Danville, Ill.

Application December 15, 1938, Serial No. 245,973

7 Claims. (Cl. 51—105)

This invention relates to certain improvements in methods of and apparatus for retreading or recapping vehicle tires; and the nature and objects of the invention will be readily recognized and understood by those skilled in the arts involved in the light of the following explanation and detailed description of the accompanying drawings, illustrating what I now consider to be the preferred steps of the method of the invention and the preferred embodiments or mechanical expressions of an apparatus of the invention, from among various other equivalent method steps and various other forms, embodiments, combinations and constructions of apparatus of which the invention is capable, within the broad spirit and scope thereof.

The invention is particularly directed to those methods of retreading or recapping the worn rubber material or composition treads of vehicle tires of the pneumatic types in which a new tread in the form of a band or strip of rubber or other suitable material, is applied over and around the worn tread of the tire without removing the original tire side walls or the shoulders or edges of the original tread, and is then vulcanized or cured into new tread forming association with the original tire and its side walls to provide the retreaded or recapped tire. A vehicle tire of the pneumatic type that has been subjected to sufficient service in use to wear down and smooth off the tire tread, is usually found to have been stretched, worn, and otherwise deformed, from regular shape and contour to result in irregularities and unevenness both circumferentially or radially, and laterally, so that without treating or resurfacing such a worn tire tread prior to the application of the new tread thereon, the retreaded or recapped tire will frequently retain and present certain of the highly undesirable irregularities and uneven conditions of the original worn tire tread. Further, in the application of a new tread band or strip in the recapping or retreading of a tire in accordance with such methods, difficulties are experienced in obtaining the desired accurate positioning of the new tread band or strip on and around and over the worn tread, in order to secure the desired straight and uniform positioning of the new tread on and around the tire to provide the desired uniformity and regularity of appearance in the retreaded tire. A tire that has been retreaded by these methods will generally present rough portions adjacent and around the edges of the new tread that has been vulcanized and formed thereon, so that it is usually found necessary to resort to various finishing operations to eliminate such rough portions in an attempt to improve the appearance of the retreaded tire.

Various attempts have been made to treat or refinish the worn tread of a tire preparatory to the new tread applying and vulcanizing operations and these attempts have, in some instances, taken the form of cutting, gouging or stripping away portions of the tread material, either manually or by machine operations, in order to prepare the worn tread for the application of the new tread strip in the retreading or recapping operation. When material is cut or stripped away from the worn tread of a tire by hand operation, a considerable period of time is required to properly complete the operation and the desired and necessary accuracy of results is difficult to attain, while with the machine cutting, gouging or stripping operations, the time element may be reduced, but it has been also found difficult to obtain accuracy and uniformity in the treatment of the tire, so that the problems and difficulties of speed of operation and of irregularity and unevenness of the treads of the recapped or retreaded tires have not been generally satisfactorily solved or substantially eliminated by such methods or practices.

In accordance with a fundamental characteristic of a method of retreading or recapping a worn tire tread by my method, the tire is first mounted in inflated condition on an accurately trued and balanced rotary holding means, such as a wheel, and the worn tread is treated or processed in preparation for applying the new tread band or strip thereto, by an abrasive or grinding action through the use of an abrasive material, such as an abrasive stone, to grind and abrade away or remove portions of the worn tread, accurately, about the tire axis so as to thereby form a surface around the periphery or circumference of the tire to provide a foundation or base for receiving the new tread strip or band, in position for the vulcanizing or curing operations, which foundation or base presents a surface that is truly centered about the axis of tire rotation.

The method is further featured by the fact that the step of grinding or abrading away a portion of the worn tread is carried out in such a manner as to form a circumferential groove of substantial width in the worn tread of the tire, while retaining the original tire side walls and opposite shoulders of the tire tread, and with the removal from the central or medial portion of the original tread of merely sufficient material to substantially eliminate irregularities and unevenness and provide the central or medial portion of the tread surface as a true circumference of the tire axis of rotation. Such grinding or abrading also serves the purpose of removing the "glaze" or smoothly worn tread surface so as to provide a new surface that will form an efficient bond with the new tread band or strip when the latter is cemented or otherwise secured thereon, and then vulcanized into new tread forming association with the original tire.

In the tire tread grinding or abrading step in accordance with the principles of my invention, the bottom wall of the groove which forms the new tread receiving base or surface, is preferably curved or crowned laterally of the tire and tire tread, and between the opposite upstanding side wall portions of the tire, this curvature being preferably formed by a circumferentially concave rotary grinding or abrading stone or wheel element, the opposite enlarged diameter end portions of which grind or abrade away the material of the tire tread at opposite sides thereof around the tire and down a distance over and along the sides of the tire carcass.

Where the step of grinding or abrading away portions of the worn tire tread of the method of the invention is carried out by a rotary grinding or abrading action, the method provides and includes the further step of feeding or revolving the tire in abrasive association with the abrading element in a direction opposite the direction of rotary abrading action and by the application of a force to revolve the tire, of merely sufficient magnitude relative to the abrading capacity of the abrading element to maintain the worn tire tread in engagement with the abrading element and feed the same therepast as the tread material is abraded away, without resulting in such overfeeding that may result in "burning" the material of the tire tread.

The method of the invention includes, as a further feature thereof, the use of a new tread strip or band that has a width less than the width of the circumferential groove ground or abraded into and around the worn tread of the tire, for the purpose of providing circumferential spaces or slots at opposite sides of and around the new tread when such tread is cemented in position in the tread groove, and in the centering and positioning of the heated vulcanizing or curing band around the tire tread by engaging structure of this band in these slots at the opposite side of the positioned tread for the purpose of insuring proper relative positioning of the vulcanizing or curing band, and the new tread during the vulcanizing operation, as well as materially speeding up the operation of mounting and applying the new tread band or strip to a tire and the operation of applying and centering the vulcanizing band around the tread.

This invention is further featured by the provision of apparatus for efficiently carrying out the method of the invention for use in preparing worn tread vehicle tires for retreading or recapping; and such apparatus is basically characterized by the provision of a rotary tire holding means in the form of a wheel accurately trued and balanced about its center of rotation upon which the tire to be processed is mounted in inflated condition, in order that the grinding or abrading step of the method may be carried out to not only form the new tread receiving groove around the tire, but also to eliminate any circumferential or radial and lateral unevenness or irregularity from the tread and thereby form the new tread receiving groove with its inner base surface as an approximately true and accurate circumference about the axis of rotation of the rotary element or wheel upon which the tire is mounted.

Another feature of an apparatus of the invention is presented by the use of a grinding or abrasive material element of the rotary stone or wheel type that is circumferentially concave or curved on a transverse radius of curvature to give the desired crown or transverse curvature to the base or bottom surface of the groove to be ground or abraded into and around the worn tire tread; and in the mounting of such a rotary grinding or abrading stone or wheel element in position to be operatively engaged by the worn tread of an inflated tire, mounted upon the trued rotary holding means in order that such means may rotate or revolve the tire in grinding or abrading relation with the rotary grinding or abrading element for the purpose of grinding or abrading out the tread groove on a true circumference about the axis of rotation of the rotary tire holding means.

Apparatus of the invention is further featured and characterized by the provision of gravity actuated means for applying turning or revolving forces to the worn tire carrying rotary holding means to turn or revolve said means in operative abrading association with the rotary grinding element automatically as the grinding element abrades or grinds out the tread material in forming the groove, so that the tire is turned or revolved at varying rates of speed in accordance with the rate at which the groove is being abraded out by the grinding element, and without requiring the additional control of an operator to feed or revolve the tire in operative grinding association past the grinding element at the proper rate for the most efficient abrading action of the latter.

Another feature of the gravity actuated operating means for the rotary tire holder resides in the provision of an arrangement by which various magnitudes of turning or revolving forces may be selected and applied to the rotary tire holding means in accordance with the size and/or condition of the worn tire to be grooved.

The apparatus of the invention is additionally featured by the provision for adjustment of the worn tire carrying means toward and from the rotary grinding or abrading element in order to determine and adjust the depth of the new tread receiving groove that is to be ground or abraded in the tire tread; and also in the provision for means or mechanism for laterally adjusting the tire carrying means to thereby adjust and center the tread of a tire mounted thereon relative to the grinding or abrading element in order to permit of accurately centering or locating the new tread receiving groove laterally or transversely on and around the worn tire tread.

A further object of the invention is to provide an apparatus embodying the foregoing fundamental features that will be structurally simple and mechanically efficient in operation under the various conditions to which such apparatus may be subjected in operation and use; and especially to provide a design and arrangement of the apparatus by which it may be readily set up and installed at a desired location to occupy a minimum of space.

Another object of the invention is to so design and arrange the apparatus that it will provide an efficient and accurate static balancing machine for determining and locating heavy portions of a vehicle wheel and tire, particularly wheels and tires of the larger sizes, such as truck wheels and tires.

With the foregoing general features, characteristics and objects in view, as well as certain others that will appear and be readily recognized from the hereinafter appearing description, this invention consists of certain novel method steps and of certain novel designs, constructions and combinations of elements, making up the apparatus, all as will be more particularly referred to and specified hereafter.

Referring to the accompanying drawings:

Fig. 1 is a view in cross section, through a worn tread tire, showing such tire mounted on the rotating and holding means in position relative to a rotary abrasive stone, preparatory to grinding or abrading the new tread receiving groove in the worn tread of such tire, the grinding stone and its actuating motor being shown in top plan;

Fig. 2 is a view in cross section through the worn tread tire of Fig. 1, showing the rotary abrasive or grinding stone in groove grinding relation and engagement with the worn tread, the tread engaging portion of the stone only being shown;

Fig. 3 is a cross sectional view through the tire of Fig. 1 after completion of the new tread receiving groove and with the new tread cemented in position in the groove, the tread being also shown in cross section;

Fig. 4 is a cross sectional view of the tire of Fig. 1 after the completion of the retreading or recapping operations and with the new tread vulcanized or cured into completed new tread forming relation with the tire side walls and grooved tread portion; the vulcanizing or curing band being shown in cross section relative to the recapped or retreaded tire after completion of the vulcanizing operation and the removal of the band;

Fig. 5 is a prospective view of one form of apparatus embodying the various features of my invention, and for carrying out the tire retreading or recapping method thereof, with a worn tread tire shown in the position of having the new tread receiving groove ground or abraded therein by the rotary grinding element, the tire mounting and holding wheel and the tire mounted thereon having portions thereof cut away to show the mounting of such wheel, and to show the new tread receiving groove ground in the worn tread of the tire.

Fig. 6 is a detailed view in vertical section through the tire carrying wheel lateral adjustment shaft, and the wheel rotating spindle or shaft, mounted therein;

Fig. 6a is a vertical transverse section taken as on the line 6a—6a of Fig. 6;

Fig. 7 is a top plan view of the apparatus of Fig. 5 showing a worn tread tire in mounted position on the tire carrying wheel of the apparatus preparatory to adjustment of the apparatus to laterally position and center the tire tread relative to the rotary abrasive stone or wheel for groove grinding operation of the latter;

Fig. 8 is a view similar to Fig. 7, but showing the tire carrying wheel in laterally adjusted position to center the abrading element relative to the tire tread, and also showing the wheel adjusted into position with the tread thereof in groove grinding association with the abrading element, a portion of the tire being broken away with the tread shown in section at the portion thereof engaged by the abrading element;

Fig. 9 is a vertical section taken as on the line 9—9 of Fig. 8, showing the groove grinding relation between the tread of a tire mounted on the tire carrying wheel of the apparatus and the rotary abrasive stone during the process of grinding out the new tread receiving groove in the worn tire tread; and Fig. 10 is a view in elevation of a rotary tack rasp embodying certain features of the invention.

The fundamental steps of a method of retreading or recapping worn tread pneumatic vehicle tires, or of preparing such worn tread tires for retreading or recapping, are exemplified by way of illustration, graphically or more or less diagrammatically, in Figs. 1 to 4, of the accompanying drawings. It is to be understood, of course, that the particular forms of implements or tools and structural elements illustrated as used in carrying out these steps are for purposes of example only, and that the method is not limited to use only with such forms.

In accordance with the primary step of the method, a pneumatic vehicle tire V having a worn tread T is mounted upon a rotary holding means such as a wheel W that is accurately trued and balanced for rotation about its axis. The tire V mounted on the wheel W is inflated to a suitable pressure to maintain the tire in the desired form during the operations performed thereon in preparing it for retreading or recapping.

With the tire V mounted on the wheel W in inflated condition, the worn tread T thereof, formed of the usual rubber material or composition, is ground or abraded away, preferably by a rotary abrading action through the use of a suitable abrading or grinding material stone or element in order to reform the worn and uneven and irregular tread T into a surface that is a substantially accurate and true circumference about the axis of the tire V and the wheel W upon which this tire happens to be mounted in the present example. This step of the method of the invention in its broader aspects, requires or calls for the grinding or abrading away of portions of the material of the worn tire tread to form a new surface on and around the tread that will be a substantially accurate and true circumference about the axis of rotation of the tire, and it is within the intention and the scope of my invention to carry out this grinding or abrading operation with the tire held in fixed position against rotation while the grinding or abrading operation is proceeded with around the tire tread, to provide a surface thereon substantially on and around a true circumference of the tire axis.

However, in the preferred expression of this step of the method, the worn tire is mounted upon a rotary holding means such as the wheel W, which latter has a trued and balanced mounting, and the tire tread is rotated by the wheel to move the worn tread thereof past a rotary abrading or grinding stone that has been adjusted into fixed position radially from the axis, about which the wheel W is rotated, so that rotation of the wheel, with the worn tread of the tire in abrasive association with the circular section rotary abrasive wheel or stone G, will result in grinding away the worn tread to refinish the surface thereof as an approximately accurate circumference about the axis of wheel rotation.

The worn tread T is preferably ground or abraded away in such a manner as to form a groove 10 in and around the tire tread, of a width slightly less than that of the tread, in order to leave the original tire side walls and opposite shoulders of the original tread as upstanding at and forming the opposite sides 10a of the groove 10. The inner or bottom wall or surface 10b of groove 10 thus provides a base upon which the new tread forming band or strip is to be received and fixed in position for forming the retreaded or recapped tire. The groove 10 ground or abraded around the worn tire tread is preferably formed transversely or laterally curved from its central or medial portion outwardly and downwardly toward the opposite side walls of the tire, and this grinding or abrading operation is so carried out that preferably only sufficient material is ground or abraded from the central or medial portion of the worn tread necessary to remove and eliminate those portions of the tread that may depart from a substantially true circumference about the tire axis. Such grinding or abrading also removes the "glaze" from a smoothly worn tread surface so as to provide a new surface on the tire tread better adapted to efficient bonding of the new tread strip or band with the tire.

Such worn tread grinding and abrading to remove irregularities and uneven conditions may be preferably carried out by the use of the rotary grinding or abrasive grit material stone or wheel element G with the operating surface of this stone or wheel given a shape and form to grind or abrade a groove into the tire tread having the desired width and the desired inner or base wall contour laterally or transversely of the tire tread. The abrasive stone or wheel element G may, as in the example here shown, be circumferentially concave or grooved to provide the grinding or abrading face or surface having the centrally depressed circumferential portion 10c and the opposite outwardly curving portions 10d to provide the opposite side portions of the abrasive element or stone G as of greater cross sectional diameter than the medial or central portion.

Following completion of the grinding or abrading of the groove 10 into the worn tire tread, with the formation of the surface 10b circumferentially around the tread as an approximately true circumference of the tire axis of rotation and while the tire is inflated and mounted on its rotating means or wheel W, the new tread forming band or strip R is positioned in the groove 10 completely around the tire, this new tread R being cemented or otherwise suitably affixed to and mounted on the new surface provided by the bottom or base wall of the groove. This new tread forming strip or band R is formed of rubber or other material capable of being vulcanized into final new tread forming relation on and around the tire; and in accordance with a further feature of the invention, is formed of a width less than the width of the groove 10 and is so positioned in this groove as to leave the spaces 11 between the edges of the strip or band and the adjacent upstanding shoulders 10a of the original tire side walls and tread, such spaces forming circumferential slots around the tire at the opposite sides of the new tread forming strip R, for a purpose to be referred to hereinafter. The tire V with the new tread forming band R fixed in the groove 10, in the position as described above, is then ready for the final step of vulcanizing or curing this new tread R onto the tire to form with the tire side walls and the shoulders 10a, the retreaded or recapped tire.

The vulcanizing of this strip or band R onto the tire can be carried out in accordance with several of the well known methods followed in tire retreading or recapping as, for example, by the use of the vulcanizing or curing band B shown in cross section in Fig. 4 of the accompanying drawings. Such a band is applied over and around the tire tread, and is maintained in position while heat is applied to vulcanize the new tread forming band or strip R onto the tire. These vulcanizing bands have their inner surfaces formed to provide the desired design and other configuration of the new tread of the retreaded tire and may be, as in the example here shown, provided with a series of rings, ribs or flanges 11a spaced apart laterally of the band and projected inwardly a distance therefrom and there around for forming the grooves R' and ribs R'' on and around the new tread R of the retreaded tire. Suitable heat applying means is provided for the band B, and such means may take the form of tubes 12 through which steam or other heating medium may be circulated. In the use of such forms of tread vulcanizing or curing bands various of the known forms of apparatus may be employed therewith to hold or secure the tire V in any desired deformed or distorted position during the vulcanizing of the new tread, as for example, to cause the tire tread to assume a substantially flat and uncurved shape transversely, but as such operations are known to the art, it is believed unnecessary to here illustrate apparatus for carrying them out or to set forth a detailed explanation of their operation and use. The method of my present invention is not limited to the practice followed or apparatus used in the vulcanizing step, except in the more limited or specific phase of the vulcanizing step that calls for the feature of centering the band by utilizing circumferential slots formed around the tread to be vulcanized, as described hereinafter.

This general type of new tread vulcanizing and curing band and its operation and use will be familiar to those skilled in the art so that it is unnecessary to set forth any detailed explanation thereof herein. Following a feature of the method of this invention, however, the new tread design forming structure such as the rings or flanges 11a on and around the inner side or face of the band B are employed in cooperation with the slots or spaces 11 provided at opposite sides of the applied new tread band or strip R to centralize and position the band B on and around the tire tread preparatory to its vulcanizing or curing functions. For example, when the vulcanizing band B is applied in position around the tire tread, the opposite outer side rings or flanges 11a of the band B are aligned with and adapted to be received in the opposite spaces 11 formed between the side walls 10a of the groove 10 and the new tread R, as will be clear by reference to Fig. 3 of the drawings. Thus, the band B and the tire tread design forming rings 11a are centered relative to the new tread strip R and held against lateral displacement during the vulcanizing or curing operation. The desired position of the new tread R is maintained and the rib and groove design is formed in desired spacing thereon; so that the resulting retreaded or recapped tire, as shown in Fig. 4 of the drawings will have a straight, uniform tread appearance closely resembling the tread of a new tire and without objectionable appearance indications of having been recapped or retreaded. Due to the accurate grinding or abrading operations by which the new tread receiving groove 10 is ground into the worn tire tread and the provision thereby of the resurfaced base or bottom wall 10b of the groove 10 as an approximately true circumference of the tire axis, an efficient bonding surface for the new tread band R is formed and in cooperation with the vulcanizing band B a new tread is formed that substantially eliminates irregularities and presents such a tread surface as a substantially true circumference about the wheel axis. By leaving the original side wall portions 10a of the tire with the new tread vulcanized onto the tire between such portions, it is possible to provide a retreaded or recapped tire that calls for no substantial finishing operations and that has the general appearance of an original and new tire.

While various forms and arrangements of apparatus may be resorted to for carrying out the steps of retreading or recapping a worn tread vehicle tire, in accordance with my method as hereinbefore explained, I have illustrated herein an efficient form of apparatus that has attained highly satisfactory results in actual operation and use, such form of apparatus being illustrated in Figs. 5 to 9 inclusive, of the drawings. Referring particularly to Fig. 5, the apparatus may, for instance, include a vertical frame 20 that comprises the spaced vertical columns or legs 21 and a cross piece or other interbracing or interconnecting bracing structure 22. This frame 20 is adapted to be mounted and installed in vertically disposed position, spaced horizontally from a suitable supporting structure such as a wall, partition, column or the like of a building in which the apparatus is installed (see Figs. 7 and 8) or other suitable fixed structure that may be provided for the purpose. This frame 20 is mounted for horizontal or lateral rocking toward and from the fixed supporting structure horizontally spaced therefrom, and may be mounted for example, upon the hinge or pivot forming bases 24, for this purpose.

A mechanism is provided for maintaining the rockable or swingable frame 20 in a desired vertical position, and for rocking this frame to various adjusted positions, such mechanism in the expression thereof here shown, including an externally threaded rod or shaft 25, mounted extending through the threaded bore of a boss or block 26, having a pin or stud 26a that is journaled in a horizontally disposed bearing 26b formed on and provided by one of the vertical columns or legs 21 of the frame 20. The threaded shaft or rod 25 extends transversely of the frame 20 to a bracket fitting 27, that is fixed or secured to the wall or other fixed supporting structure 23, the end of rod 25 being rotatably secured in such bracket 27. A hand wheel or the like 28 is fixed to the outer end of the rod 25 for rotating such rod to thereby rock or swing the frame 20 on its pivoted bases 24, toward and from the fixed supporting structure 23. The pivotal mounting of threaded rod receiving block 26 permits relative movement between the block 26 and frame leg 21 to prevent binding of the rod and block as the frame 20 is rocked.

The upper ends of the vertical legs or columns of the frame 20 provide axially aligned bearings 29 for rotatably receiving a tubular adjusting shaft 30 which is mounted to extend therethrough across and between the upper ends of the frame legs 21. The shaft 30 is externally threaded at 30a along one end portion thereof, and this external threading is received in internal threading formed within the bore of the bearing 29 that receives such threaded portion of the shaft 30. The opposite bearing 29 that receives the opposite end portion of shaft 30 is formed for free rotation of the shaft 30 therein and for axial sliding of the shaft therethrough. In this manner, by rotating the adjustment shaft 30, the threading 30a feeds this shaft axially in one direction or the other through the bearings 29, depending upon the direction of rotation of the shaft. A hand wheel 31 is fixed to the shaft 30 for rotating the same to thereby feed the shaft in an axial direction through bearings 29 to the desired adjusted positions. A lock nut 30b having an operating handle 30c is provided on the threaded portion of the shaft for engagement against the adjacent bearing 29 for the purpose of releasably locking the shaft 30 in an adjusted position.

A spindle or shaft 32 is rotatably mounted in and extending through the tubular adjustment shaft 30, this spindle being journaled in suitable anti-friction bearings of the ball or roller type 32a, mounted in and carried by tubular shaft 30 at suitably spaced positions therein. The spindle or shaft 32 is accurately centered and mounted in truly horizontally disposed position for rotation in the anti-friction bearings, freely and with a minimum of friction. The spindle 32 extends outwardly a distance beyond and clear of the opposite ends of the tubular adjustment shaft 30 within which it is journaled, and at one end this spindle is adapted to receive a tire carrying means, such as the wheel W and at the opposite end is adapted to have fixed thereon a wheel in the form of a stepped pulley 33 through the medium of which wheel rotating or revolving forces are applied to the spindle. The pulley 33 may be provided, as in the example here shown, with three steps or portions, 33a, 33b, and 33c of different diameters. The pulley 33 is suitably keyed or otherwise locked onto the end of the spindle 32 and each of the steps thereof is provided with an opening, such as 34, into which the end of an operating cable may be releasably secured, or in place of such an opening, a suitable hook, eye or other cable end receiving and fastening means may be employed as the equivalent thereof. A grooved roller or the like 35, is rotatably mounted in fixed position above the spindle driving pulley 33 and a cable 36 is supported over and around this roller 35 and has one end thereof releasably secured to the desired diameter step of the pulley 33. The opposite end of the cable 36 has a weight 37 attached thereto in position suspended thereby so that when the cable 36 is wound upon and around a step of the pulley 33, the weight 37 under the action of gravity, applies rotating forces to the spindle 32 through the cable 36 and the spindle driving pulley 33.

The extended end of the spindle 32 opposite the spindle driving pulley 33 is adapted to receive and have fixed thereon, a tire carrying wheel W and in the example hereof, for the purpose of receiving and accurately centering and balancing the wheel W, the spindle 32 is provided with an inner cone member 38 fixed thereon, and having bearing against the adjacent end of the tubular adjustment shaft 30, and an outer cone member 39 removably and adjustably threaded onto the outer end of the spindle 32 with a lock nut 39a threaded onto the spindle at the outer side of cone 39. It is to be here noted that the spindle 32 may be maintained against axial displacement in the tubular adjustment shaft 30 by the wheel mounting cone member 38 having bearing engagement at one end of shaft 30 and the spindle driving pulley 33 having bearing engagement with and against the opposite end of the tubular shaft 30.

The wheel or rotary tire holding member W may be of any desired form and construction that includes the hub portion 40 for receiving the wheel mounting end of the spindle 32, and the rim portion 41 for receiving and securing a tire V in inflated condition thereon for rotation thereby and therewith. The wheel W is mounted and accurately centered on the spindle 32 on and between the inner and outer cone members 38 and 39 with the wheel hub and the wheel locked in such accurately centered position, between these cone members by the lock nut 39a. The wheel W is mounted on the spindle and removed therefrom with the cone 39 and the lock nut 39a removed from the outer end of the spindle. In applying the wheel, the hub is first placed over the spindle end with its inner side against the inner cone 38 and the outer cone is then threaded onto the outer end of the spindle and screwed inwardly into position, fixing the wheel hub between the inner and outer cones, after which the lock nut 39a is screwed into position, locking cone 39 against axial displacement on the spindle.

The rotary grinding or abrasive stone or wheel G is mounted and supported, in this instance, in a normally fixed position adjacent the tire carrying and holding wheel W for operative grinding and abrading association with the tread of a tire V mounted in inflated position on such wheel W by suitable adjustments of the wheel laterally and radially of the abrasive stone G. For instance, in the particular example here illustrated, the grinding or abrasive material stone G is positioned adjacent the rim of the wheel W intermediate such wheel and the supporting wall or other structure 23 from which the wheel mounting and adjusting mechanism is supported. The grinding or abrasive stone G is keyed or otherwise suitably fixed upon a driving or rotating shaft or spindle 42 for rotation thereby, which shaft, in this instance, happens to be the extension of the shaft of a motor M mounted and supported in any suitable manner as by a base structure 43, supported from the wall 23 or other suitable adjacent structure. It has been found in practice that with a grit silicate material forming the grinding or abrading stone or wheel and employing a coarse sized grit, such a grit material being designated in the trade as 10–20 grit silicate, grade P Bond SPC-1, it is possible to attain satisfactory rates of cutting speed when such an abrasive material stone is rotated by the motor M at approximately 1750 R. P. M., although it is to be understood that this character of abrasive stone material and this rate of rotation of the stone or wheel, are given merely by way of example and not of limitation. The cutting speed of the rotary abrasive stone or wheel from my present observations of actual operations, appears to be dependent upon the character and size of the grit and the hardness of the grit material employed for the abrasive stone. I have found that the softer types of grit material tend to cut at a faster rate than the harder grit materials because, apparently, the abrasive or grit particles are broken off more readily from the grinding surface of the wheel so that new cutting surfaces are being constantly exposed, but, obviously, while the cutting rate may be increased, the life of the softer type of grit material wheels is materially less than that of the harder types. In the grinding or abrading away of the rubber material surface of the tire tread, it is found that the grinding or abrading rate of speed that may be employed is limited by the fact that the rate of grinding or abrading speed must not be sufficient to cause burning of the tread material. Obviously, my invention as to this grinding step, is not limited in all respects to the specific characteristics of the abrasive material in the above recited example, as the invention contemplates and includes the use of any grinding or abrading materials suitable to this work, and operated at any speed higher than those here given, that will permit such higher speed operation, due to character of the abrasive material, without burning the tread material or otherwise damaging or deteriorating the tread material.

With the grinding or abrasive stone or wheel G mounted in accordance with the example hereof, a worn tread tire V is secured on the trued and balanced wheel W; referring now particularly to Figs. 7 and 8 of the drawings, the wheel carrying frame 20 having been rocked or swung by operation of the adjusting rod 25 to a position in which there is ample clearance from the abrasive stone G to permit mounting and inflation of the tire V of the wheel W. Such initial position of the wheel W and the inflated tire V thereon may be that such as shown in Fig. 7 of the drawings, with the tire held laterally out of operating alignment with the grinding or abrasive wheel G. The adjusting shaft 30 is then released by the lock nut 30b and the hand wheel 31 is rotated in the proper direction to feed shaft 30 to laterally move wheel W with tire V into position centered laterally with the grinding or abrasive stone G, such laterally adjusted and centered position being shown by Fig. 8 of the drawings. Lock nut 30b may then be rotated to position locking shaft 30 against axial displacement to thereby maintain the wheel and tire in the laterally adjusted position. The adjusting rod 25 is then rotated by hand wheel 28 to move wheel W and the inflated tire V thereon into position with the worn tread of the tire V in operative grinding and abrading association with the abrasive stone or wheel G, this adjustment being made to the extent necessary to determine the initial depth to which the groove 10 in the tread of the tire is to be ground or abraded. The full adjusted positions of the apparatus are disclosed in Fig. 8.

The grinding or abrasive stone or wheel G, is, in this instance, rotated in the direction of the arrow of Fig. 5 so that the surface of the stone or wheel G moves downwardly into and away from grinding or abrasive engagement with the tire tread, while the tire V during the grinding or abrading operation has forces applied thereto to rotate or revolve this wheel with the tread of tire V moving upwardly past the grinding stone, that is, in a direction opposite the direction of rotation of the latter, as indicated by the arrows appearing on the tire V in Fig. 5. A feature of my invention resides in the automatic rotation of wheel W to feed the tread of a tire V mounted thereon upwardly past the grinding wheel G, in operative grinding association with the latter, as the grinding away of the tire tread and the formation of the groove 10 therein progresses. By this feature, the rotating forces are so related to the rate of rotation and the grinding or abrading characteristics of the stone or wheel G, that the tire tread will not be fed too rapidly and will not be under sufficient pressure to cause burning of the tread material or other damage thereto. Also, the rate of revolution of the wheel will vary with the rate of grinding by the abrasive stone G, so that the rate of operation will be greater for those portions of the tread having less material to be abraded away than for those portions having increased quantities of material to be removed.

Such an automatic feeding mechanism, may take the form illustrated in Figs. 5, 7 and 8 of the drawings, that includes the hereinbefore described stepped driving pulley 33 for the wheel spindle 32. Depending upon the size and other characteristics of the particular tire being worked upon, the weight carrying cable 36 is attached at one end to that step of the pulley steps 33a, 33b, and 33c that has the desired diameter to obtain the proper turning forces from the particular magnitude of weight 37 that is employed. At the start of the grinding operation, and prior to final operative adjustment of the apparatus to balance the tire in grinding association with the wheel G several turns of the cable 36 are taken about that pulley step to which the cable has been attached. The weight 37 is then in suspended position applying rotating forces to the spindle 32 and through this spindle, and wheel W to the tire V so that as the grinding or abrasive stone G cuts away the tread of the tire, the tire tread is forced under the proper pressure continuously and constantly upwardly against the cutting surface of the grinding stone, and the wheel is revolved only as rapidly as the desired depth of material may be ground or abraded away. By varying the magnitude of the weight 37 and/or dependent upon the diameter of that step of the pulley 33 around which the cable 36 is wound, the rotating forces applied to the spindle 32 and to the tire V can be adjusted and controlled. By such tire rotating or feeding arrangement, as the speed of the grinding or abrading operation increases upon reaching those portions of the tread having less material to be ground or abraded away to reach the depth of grind for which the apparatus has been adjusted, the tire V being under constant revolving forces will be rotated automatically at a correspondingly increased rate so that the desired abrading relationship under the proper tire feeding force is automatically maintained throughout the operations.

In the operation and use of apparatus in accordance with the embodiment herein presented, and with the use of rotary grinding or abrading stones of the general characteristics hereinbefore discussed, it has been found usually preferable to limit the depth of cut to approximately the order of $\frac{3}{16}$ of an inch. By so limiting the depth of each cut, it has been found generally advisable to carry on the grinding operation for two or three revolutions of the tire in abrasive engagement with the grinding or abrasive stone for the purpose of forming the groove in the tire tread of the desired depth of cut although, of course, the invention is not limited in any particular respect to the depth of the tread groove or to the depth of material abraded away by the abrasive wheel for each revolution of the tire. These are factors rather primarily dependent upon the character of abrasive material and the composition and condition of the particular tread material being worked upon. The diameter of the grinding or abrasive material wheel G in one example in actual operation, is approximately 10″ and with such diameter abrasive wheel, an approximately 40 lb. weight was used to apply the wheel rotating forces through a 12″ diameter driving or rotating pulley for the wheel spindle 32. Where larger tires are being worked upon, such as truck tires having greater tread width and greater diameter, the weight employed to generate the wheel rotating forces is increased, and a greater diameter driving pulley or pulley step, may be employed. Attention is here directed to the fact that if the grinding or abrasive material stone is operated off center or out of line, and is not approximately accurately trued about its operating shaft, then a greater portion of the abrading load is placed upon a portion only of the grinding element with the result that burning of the tread material usually takes place, so that the accurate positioning of the grinding or abrasive wheel G, with its axis parallel to the axis of the rotation is desirable. The depth of the groove or refinished new tread receiving surface abraded onto the worn tread is, in accordance with the principles of my invention, such that a minimum of material is abraded from the central or medial portion of the original tread while obtaining the new surface as an approximately true circumference about the tire axis. The deepest grooving and the greatest amount of material abraded away is from the opposite side portions of the tread and down over the tire carcass and toward the opposite side walls of the tire.

With respect to that feature of the invention by which the worn tire tread is resurfaced by removing material therefrom, and the new surface prepared on the tread is given its contour and shape by using an element having a working surface for removing the tread material of the contour and shape that it is desired to produce on the tread, my invention contemplates and includes the use of a rotary tack rasp, having its operating face or side shaped in accordance with the desired shape to be given the resurfaced tread. For example, in Fig. 10 I have shown a rotary rack rasp 50 having a circumferentially concave peripheral surface 51 provided with the needles or tacks 52 arranged with their operating points in a concave plane, broadly equivalent to the circumferentially concave grinding or abrasive material wheel G of the invention. However, the use of a tack rasp of this character is primarily intended for preliminary operation on a tire preparatory to completing the operations by the use of any abrasive stone or wheel in accordance with the abrading operation of the present invention and is particularly adapted to work upon the larger size tires that may be badly cupped, due to some misalignment condition under which such tire has been in service. With such a badly cupped tread in a larger size tire, it may be necessary to remove as much as approximately ½″ of rubber from certain portions of the tread, and experience has demonstrated that such material can be more rapidly removed in a preliminary operation by the use of a tack rasp. With a tack rasp of the circumferentially concave form of my invention, the major portion of the tread material on a large size tire may be removed, and then the operations completed by the use of the grinding or abrasive material rotary element of the character of element G of the invention, to remove the remainder of the tread material.

The tack rasp 50 of Fig. 10 is not limited to the size or character of the material removing members 52, as if desired or found expedient, the material removing surface may be file-like, or of the burr type, to form the circumferentially concave material removing, cutting or grinding surface, and my invention contemplates and includes the use of such tread material removing surfaces.

The apparatus of the invention, hereinbefore described and disclosed in the accompanying drawings, may also be employed as a static balancing machine for determining those portions, if any, of a wheel and tire that may be heavy and out of balance. This function is made possible, due to the substantially frictionless mounting of the spindle shaft 32 and its accurate positioning, together with the provision for truing a wheel and tire in mounted position on the spindle by means of the mounting cones 38 and 39, so that by removing wheel W and mounting the wheel and tire of a vehicle on spindle 32, rotation of the wheel and tire may be then carried out to readily and accurately determine the heavy portion or portions of the wheel and tire. Also, the apparatus may be efficiently used for the purpose of truing-up distorted new tires or completed retreaded or recapped tires.

It will also be evident that as to the method of the invention, various equivalent steps may be resorted to, while as to the apparatus various other forms, embodiments, arrangements, constructions, combinations, additions or eliminations might be resorted to, all without departing from the spirit and broad scope of my invention; and hence I do not wish to limit or restrict the invention in all respects to the exact disclosures or specification hereof.

I claim:

1. In an apparatus for retreading vehicle tires in combination, a wheel member mounted for rotation about a horizontal axis, said wheel being adapted to mount and hold thereon and there around a tire to be retreaded, a rotary member for removing material from the tread of a tire mounted on said wheel member, said rotary material, removing member being mounted for rotation about a horizontal axis parallel to the axis of rotation of said wheel member and being disposed spaced radially from but transversely of the periphery of said wheel member and adapted for tread material removing association with the tread of a tire mounted on said wheel member, means for rotating said material removing member, and gravity actuated means for applying a rotating force of constant magnitude to said wheel member to revolve a tire mounted on said wheel member to feed the tire tread past the rotary tread material removing member with the latter in operative association with the tire tread.

2. In an apparatus for retreading vehicle tires in combination, tire rotating means including a horizontally disposed rotary spindle and a tire mounting wheel member on said spindle for rotation thereby, said wheel member adapted to mount and hold a tire thereon and there around to be retreaded, a rotary grinding member mounted for rotation about a horizontal axis parallel to the axis of tire rotation, said rotary grinding member being mounted adjacent but spaced from the periphery of said wheel member in position to be operatively engaged with the tread of a tire mounted on said wheel member, means for rotating said grinding element, a driving pulley member fixed to said wheel rotating spindle, and gravity actuated means for applying wheel rotating forces to said spindle, said means embodying a flexible member attached at one end to said driving pulley and wound there around with a weight member attached to and suspended by the opposite end of said flexible member.

3. In an apparatus for retreading vehicle tires, in combination, a vertically disposed frame structure mounted for rocking about a normally fixed horizontally disposed axis, a spindle rotatably mounted in horizontal position on said frame structure spaced above the axis about which said structure is rockable, a wheel member mounted in trued and balanced position on said spindle for rotation with said spindle as an axis, mechanism for moving said spindle axially in either direction to laterally adjust the position of said wheel member and for releasably locking said spindle in laterally adjusted position, a rotary grinding element mounted for rotation about a normally fixed horizontal axis parallel to the axis of rotation of said wheel member, said rotary grinding element being disposed transversely of and across the periphery of said wheel member and being adapted to engage the tread of a tire mounted on said wheel member, and means for releasably locking said frame structure in an adjusted position to maintain the axis of said wheel member spaced a predetermined distance from said grinding element during a grinding operation.

4. In an apparatus for retreading vehicle tires, in combination, a rotary grinding element mounted for rotation about a normally fixed axis, a rotary wheel member mounted for rotation about an axis parallel to the fixed axis of rotation of said grinding element, means for maintaining said wheel member axis in constant parallelism with said grinding element axis, said wheel member adapted to mount a tire on and around the wheel member periphery for grinding engagement of the tire tread by said grinding element, mechanism for laterally adjusting the wheel member on its axis of rotation and for releasably locking said member in an adjusted position, said wheel member being mounted for movement toward and from said grinding element with the wheel member and grinding element axes of rotation maintained constantly parallel, and means for releasably locking said wheel member in an adjusted position to maintain the wheel member and grinding element axes spaced a fixed and predetermined distance apart during a grinding operation.

5. In an apparatus for retreading vehicle tires, in combination, a rotary grinding element mounted for rotation about a normally fixed axis, a wheel member mounted for rotation about an axis parallel to the fixed axis of rotation of said grinding element, means for maintaining said wheel member axis normally in constant parallelism with said grinding element axis, said wheel member adapted to mount a tire on and around the wheel member periphery with the grinding element in grinding engagement with the tire tread, mechanism for laterally adjusting the wheel member along its axis of rotation to position the tread of a tire on said member relative to the grinding element, said wheel member being mounted for movement toward and from said grinding element with the wheel member and grinding element axes maintained constantly parallel, means for releasably locking said wheel member in an adjusted position to maintain the wheel member and grinding element axes spaced a fixed and predetermined distance apart during grinding engagement of a tire tread by said grinding element, and means for rotating said wheel member to feed the tread of a tire thereon past said grinding element.

6. In apparatus for retreading vehicle tires, in combination, a rotary grinding element mounted for rotation about a normally fixed axis, a wheel member mounted for rotation about an axis parallel to the fixed axis of rotation of said grinding element, means for maintaining said wheel member axis normally in constant parallelism with said grinding element axis, said wheel member being adapted to mount a tire on and around the wheel member periphery with the grinding element in grinding engagement with the tread of a tire mounted on said wheel member, said grinding element having a width less than the width of the tread of a tire mounted on the wheel member, mechanism for laterally adjusting the wheel member along its axis of rotation to center the grinding element relative to a tire tread, said mechanism including means for releasably locking the wheel member in a laterally adjusted position, said wheel member being mounted for bodily movement toward and from said grinding element with the wheel member and grinding element axes maintained constantly parallel, and means for releasably locking said wheel member in an adjusted position with the wheel member axis spaced a fixed distance from the grinding element axis, whereby said grinding element will grind out a circumferential groove in and around the tread of a tire with the base wall of the groove substantially truly concentric with the wheel member axis.

7. In apparatus for retreading vehicle tires, in combination, a vertically disposed frame mounted for rocking in a vertical plane about a normally fixed horizontal axis, a horizontally disposed spindle rotatably mounted on the upper portion of said frame, a wheel member mounted in trued and balanced position on said spindle for rotation about said spindle as an axis, mechanism for moving said spindle in either direction axially thereof to laterally adjust the position of said wheel member, means for releasably locking said wheel member in axially adjusted position, a rotary tread material removing member mounted for rotation about a normally fixed horizontal axis parallel to the axis of rotation of said wheel member, said material removing member being disposed transversely of and across the periphery of said wheel member for material removing engagement with the tread of a tire mounted on said wheel member, means for rocking said frame structure to radially move said wheel member toward and from said tread material removing member to thereby position said wheel member a spaced and predetermined distance from said tread material removing member with the axis of rotation of said material removing member in constant parallelism with the axis of said wheel member, and mechanism for rotating said wheel member to rotate a tire mounted thereon to thereby feed the tread of the tire past the rotary material removing member during rotation of the latter in engagement with the tire tread.

PAUL D. WILSON.